(12) United States Patent
Tarasinski (10) Patent No.: US 8,408,057 B2
(45) Date of Patent: Apr. 2, 2013

(54) MEASURING ARRANGEMENT AND MEASURING PROCESS FOR FLUID PRESSURE CYLINDERS

(75) Inventor: Nicolai Tarasinski, Kaiserslautern (DE)

(73) Assignee: Deere & Company, Moline, IL (US)

( * ) Notice: Subject to any disclaimer, the term of this patent is extended or adjusted under 35 U.S.C. 154(b) by 348 days.

(21) Appl. No.: 12/680,666

(22) PCT Filed: Aug. 19, 2008

(86) PCT No.: PCT/EP2008/060859
§ 371 (c)(1),
(2), (4) Date: Mar. 29, 2010

(87) PCT Pub. No.: WO2009/043637
PCT Pub. Date: Apr. 9, 2009

(65) Prior Publication Data
US 2010/0206061 A1 Aug. 19, 2010

(30) Foreign Application Priority Data
Sep. 27, 2007 (DE) .......................... 10 2007 046 139

(51) Int. Cl.
*G01M 17/06* (2006.01)
(52) U.S. Cl. .................................................. 73/117.02
(58) Field of Classification Search ............... 73/114.26, 73/114.27, 114.28, 117.01, 117.02
See application file for complete search history.

(56) References Cited

U.S. PATENT DOCUMENTS

| | | | | |
|---|---|---|---|---|
| 4,588,953 A | * | 5/1986 | Krage | 324/636 |
| 5,004,264 A | * | 4/1991 | Kozaki et al. | 280/5.51 |
| 5,342,176 A | * | 8/1994 | Redlich | 417/212 |
| 5,496,153 A | * | 3/1996 | Redlich | 417/212 |
| 6,005,395 A | * | 12/1999 | Chan et al. | 324/635 |
| 6,445,353 B1 | * | 9/2002 | Weinbrenner | 343/763 |
| 7,081,059 B2 | * | 7/2006 | Iwamoto et al. | 474/109 |
| 2004/0012253 A1 | * | 1/2004 | Stephane et al. | 303/114.3 |
| 2004/0092349 A1 | * | 5/2004 | Iwamoto et al. | 474/109 |
| 2011/0068775 A1 | * | 3/2011 | Lin | 324/207.2 |

* cited by examiner

*Primary Examiner* — Eric S McCall (57) ABSTRACT

A measuring arrangement for measuring the movement of a piston within a housing of a fluid cylinder includes a voltage generating arrangement for generating a reference voltage which is coupled to two locations of the cylinder which are spaced from each other in the direction of movement of the piston within the housing, these two locations being separately coupled to a piston movement evaluation arrangement which is also separately coupled to one or more further locations of the cylinder to which the two locations are electrically coupled so as to receive varying measurement voltage(s) as the two locations move relative to the further location(s). The evaluation arrangement uses the measurement voltage(s) to determine the piston movement.

18 Claims, 6 Drawing Sheets

Fig. 1

Fig. 6

MEASURING ARRANGEMENT AND MEASURING PROCESS FOR FLUID PRESSURE CYLINDERS

FIELD OF THE INVENTION

The invention concerns a measuring arrangement and a measuring process for the determination of the position of a piston of a cylinder arranged in a cylinder housing so that it can be moved. The measuring arrangement includes an arrangement for the generation of a reference voltage, an application arrangement for the application of the reference voltage, a detecting arrangement for the detection of a measurement voltage and an evaluation arrangement. Moreover, the present invention concerns a steering arrangement of a steering cylinder of a vehicle equipped with such a measuring arrangement.

BACKGROUND OF THE INVENTION

A cylinder, in the sense of the present invention, includes in particular a cylinder housing with a piston arranged to move within the housing. The piston usually is provided with a piston body and/or a piston rod. The rod may extend out of the cylinder housing.

SUMMARY OF THE INVENTION

For the determination of the position of a piston, that is arranged so as to move in a cylinder housing, that is for example the piston of a hydraulic cylinder, numerous technical solutions are known. Particularly resistive, capacitive, optical, magnetic or inductive measuring devices can be attached to the cylinder or integrated into the cylinder. Moreover, solutions are known in which the piston rod is used as a part of the measuring system in which, for example, the piston rod is magnetized, coated or etched in a certain way in order to represent a measurement of the path that is detected by a detector or a sensor. The aforementioned solutions generally require costly sensor elements and/or a particular processing or handling of the piston or the piston rod. Moreover, these are sensitive to external environmental effects such as contamination, rain water, temperature variations and mechanical loading.

In this connection reference may be made for example, to U.S. Pat. No. 4,961,055 from which a measuring arrangement or a cylinder is known that operates according to a capacitative measuring system.

Therefore, the problem underlying the present invention as seen as that of defining a measuring arrangement of the type cited initially and to further develop it, through which the aforementioned problems are overcome. Particularly a measuring arrangement and a measuring process of the kind cited initially should be attainable at low technical expense.

This problem is solved according to the invention by the teaching of patent claim 1. Further advantageous embodiments and further developments of the invention follow from the subordinate claims.

According to the invention a measuring arrangement of the kind cited initially is characterized by the referenced voltage that can be applied at a first and at a second position of the cylinder, the reference voltage can be applied to the cylinder by means of the application arrangement. The first position is arranged at spacing away from the second position relative to the direction of movement of the piston. The measurement voltage can be detected by means of the detection arrangement at a third position of the cylinder. The value of the reference voltage and the value of the measurement voltage can be supplied to the evaluation arrangement. The arrangement for the generation of a reference voltage supplies not only the reference voltage but also a reference current. Correspondingly the application arrangement can be used to detect the reference voltage applied to the cylinder or the reference current conducted into the cylinder. The detection arrangement is used on the one hand for the detection of the measurement voltage and on the other hand for the detection of the measurement current. In case that in the following reference had been made only to a reference voltage or a measurement voltage, this can equally well refer to the reference current or the measured current. The electrical connection between the arrangement for the generation of the reference voltage and the application arrangement can be realized, for example, by means of flexible electrically conducting cable that can be fastened in each case to the first and second position on the cylinder. By the same token the measurement voltage can be detected by means of the detection arrangement on the third or on a further position along the cylinder, where the electrical connection is realized by the evaluation arrangement by means of flexible electrically conducted cable.

According to the invention it has been recognized initially that the cylinder, particularly a hydraulic cylinder can be used as a variable electrical resistance or as variable electrical voltage divider (potentiometer). The change in the electrical resistance or the change of a resistance relationship of the cylinder can accordingly be used as a measure for the position of the piston of the cylinder that is arranged so as to move within the cylinder housing. A voltage drop occurs along the length of the piston or the piston rod. Usually a piston or a piston rod is provided with a constant cross section across the active region, across which the piston or the piston rod is moved. Correspondingly a voltage drop across this active region is linear with respect to the first or second position of the application arrangement, at which the reference voltage is applied to the cylinder.

According to a preferred embodiment of the invention, the third position is arranged spaced at a distance away from the first position and/or from the second position. In that way the third position can be arranged between the first and the second position, for example exactly in the center. But it is also conceivable that the third position is arranged at or close to the first or the second position. An arrangement of the third position at a location that is not localized between the first and the second position is also conceivable.

There is the possibility to detect and measure the reference voltage by means of the so-called Kelvin detector at the first or second position by which the reference voltage can be applied to the cylinder by means of the application arrangement. Thereby the exact value of the reference voltage can be detected directly at the cylinder, which increases the accuracy of the measurement and that permits a conclusion as to possible errors. Therefore the detection arrangement is preferably provided with one device by means of which the reference voltage can be detected along the cylinder, where preferably a first device is provided at the first position end a second device is provided at the second position.

According to a preferred embodiment of the invention, the application arrangement exhibits at an at least one further position a further device, by means of which a measurement voltage can be sensed along the cylinder. On the one hand, by the provision of at least one further device for the detection of the particular immediate measurement voltage, the measurement precision can be increased and on the other hand the side flow resistance, caused by the housing of the cylinder, can be detected or if necessary compensated for.

Basically at least one of the three positions can be provided on the cylinder housing and/or on the piston. Preferably such a position is provided at the outer end of the piston or the piston rod. In that way, the first position may be arranged at one end of a piston of a differential cylinder. The second position may be arranged at the opposite end of the piston of the differential cylinder and the third position at which the measurement voltage can be detected by means of the evaluation arrangement, may be arranged in a central region of the cylinder housing of the differential cylinder. Alternatively the first position may be provided at an outer end of the piston of a piston extending merely one-sidedly out of the cylinder housing or a piston rod extending merely one-sidedly out of the cylinder housing. The second position can be arranged at the end of the cylinder housing opposite to the first position and the third position may be arranged in a central region of the cylinder housing between the first and the second position. Thereby the cylinder housing can be connected electrically with the piston, for example, by means of an electrically conducting cable provided in the cylinder. However, both the first and the second position may be arranged in each case at an end region of the cylinder housing of a differential cylinder and the third position may be arranged at one end of the piston.

According to a preferred embodiment of the invention, the first, second and/or the third position is arranged on the outside of the cylinder. This can be performed, for example at low cost, by applying or attaching corresponding cable ends with screws. In addition here it is not necessary to configure the cylinder in a particular way, as provided, for example, in the case of U.S. Pat. No. 4,961,055. As far as this is concerned the measurement arrangement according to the invention can be adapted or realized—even subsequently—to a conventional cylinder or a hydraulic cylinder. In any case the interior of the cylinder needs to be modified not at all or only to a minor degree.

According to a further preferred embodiment of the invention, the evaluation arrangement is provided with at least one sliding contact at the point of entry of the piston or the piston rod into the cylinder housing, that is connected to the piston or the piston rod by an electrically conductive connection. In this way the measurement can be attained independently of the contact resistance relationships in the area of the seal between the piston and the cylinder housing. It is conceivable that the sliding contact at the entry of the piston or the piston rod into the cylinder housing represents the single point of contact for the measurement voltage.

Moreover, provision can be made for an electrically insolating seal that is provided between the piston or the piston rod and the cylinder housing in the area of the entry of the piston into the cylinder housing. The electrically insolating seal may, for example, be provided by a ceramic coating or a rubber or plastic seal. In that way, for example, a conventional, metallic sliding-contact bearing can be provided, that is surrounded on the side of the housing by an electrically insulation material. By these measures the shunt resistance on the basis of the housing can largely be avoided.

According to a preferred embodiment of the invention the piston is connected with the cylinder so as to conduct electricity. This can be attained, for example, by means of a sliding contact between the piston and the inner wall cylinder housing, where the sliding contact can be arranged at the middle of the piston or the piston rod and can establish an electrical contact with the interior of the cylinder housing.

In this way a safe measurement voltage evaluation can be assured. In addition or alternatively the metallic contact points that may be available under certain circumstances in the area of the seals that may already have been provided anyway between the piston and the cylinder, can be used for the evaluation or as bridge for the measurement voltage.

In case that the cylinder is configured in such a way that the piston can extend or retract at one side of the cylinder, the measurement arrangement according to the invention and the measurement principal underlying the measurement arrangement can be applied to great advantage to such a cylinder as well. Such cylinders are frequently applied in industrial utility vehicles, such as, for example, on dredges and construction machines, but also in agricultural utility vehicles, such as, for example, in tractors, and are used there to execute positioning movements for the movement of loads. In that way reference can be made, for example, to the lifting arrangement of the three point implement hitch of a tractor or to the at least one cylinder of a loader. Therefore, for such a one sided cylinder it may be advantageous that a position in the interior of the cylinder housing be connected electrically with a position of the moveable piston in the interior of the cylinder housing by means of a flexible electrical connection.

The cylinder may be considered as a hydraulic cylinder or a pneumatic cylinder. Accordingly the cylinder is supplied with hydraulic fluid in such a way that the piston is retracted into the cylinder housing or the piston is extended out of the cylinder housing. For this purpose the hydraulic cylinder may be configured as single acting so that only the extension of the piston is brought about by the supply of pressurized hydraulic fluid into the piston chamber of the hydraulic cylinder. Alternatively, the hydraulic cylinder may be configured as double acting, that is, it is provided with a piston chamber and a rod chamber, each of which can be supplied with pressurized hydraulic fluid. With such a hydraulic cylinder an active retracting and extending of the piston or the piston rod is possible. Comparable methods of operation are conceivable for pneumatic cylinders. As noted previously, the cylinder may be provided with a piston extending at only one side of the cylinder or a piston rod extending at only one side of the cylinder. Alternatively the cylinder can extend the piston or the piston rod on two opposite sides out of the cylinder housing, as is the case, for example, with a differential cylinder.

According to a preferred embodiment of the invention, the arrangement for the generation of a reference voltage can provide a direct current voltage, an alternating current voltage or a pulsed direct current voltage as reference voltage. The direct current voltage or the alternating current voltage generated by the arrangement for the generation of a reference voltage is measured in such a way that the necessary power output can be generated without any problem by the usual electronic components. Since on the other hand, the electrical resistance of the piston or the piston rod of the cylinder is comparably low, the reference voltage will be correspondingly small and the reference current will be selected as relatively high. In that way, for example, for a hydraulic cylinder with a piston rod diameter of 30 mm a reference voltage of 10 mV and a reference current of 100 Amps may be selected. Obviously, values varying from the above by a wide margin are possible or are necessary, since the measurement principle does not basically depend on the value of the reference voltage.

In case the arrangement for the generation of a reference voltage provides an alternating current voltage, the current can flow at a higher rate along the surface of the piston or the piston rod due to the skin-effect. Thereby a higher voltage drop-off results compared to the application of direct current, which can be evaluated more easily. In case that the arrangement for the generation of a reference voltage provides a pulsed direct current voltage, there is the possibility that a reference voltage is applied only in case that a measurement voltage is to be measured. Accordingly, the average power output therefore is lower than in the case of a non-pulsed, continuous direct current voltage.

Known processes can be used that are known from the state of the art for the evaluation of the measurement voltage or the measured reference voltage by means of the evaluation arrangement. In particular, carrier frequency measurement amplifiers or measurement bridge amplifiers can be applied.

According to a preferred embodiment of the invention, the measurement voltage is performed by means of a multi-channel delta-sigma-analog-digital-converter, for example, the model LTC 2444 of Linear Technology Corporation, 1630 McCarthy Boulevard, Milpitas, Calif. 95035, USA. Correspondingly the evaluation arrangement is provided with such a multi-channel delta-sigma-analog-digital converter. Thereby the at least one device for the measurement of the reference voltage may be connected to the reference voltage inputs of the delta-sigma-analog-digital converter. In this case the delta-sigma-analog-digital converter measures all input magnitudes or measurement voltages in each case relative to the reference voltage. Correspondingly it is not required to make available a separate measurement and evaluation of the reference voltage as well as a stabilized reference voltage. Fundamentally, such a delta-sigma-analog-digital converter permits an economical measurement of such comparably smaller direct current voltages or alternating current voltages with high precision, that is, for example, with a resolution of 0.0005% or 24 bit.

Since the aforementioned Delta-Sigma-Analog-Digital Converter is configured with multiple channels, it is possible to detect and evaluate without any problem several measurement voltage evaluations by means of one further device of the evaluation arrangement for the evaluation in each case of a measurement voltage at the cylinder. Thereby errors can be recognized and compensated for, for example, an interruption of individual evaluations, in which, for example, in normal operation an average of several evaluation is calculated and is used as position signal for the piston in the cylinder housing. In the case of an error, that particular evaluation is not considered, this can be recognized, for example, by the value of the measurement voltage of 0 or it is not in a relative linear relationship to the other measurement voltage values. Moreover, the fraction of the measurement current flowing through the by-pass resistance of the housing can be detected and compensated for mathematically.

For some applications it is necessary that the position of a piston in a piston housing of a cylinder be determined completely redundantly. An example for this is the operating regulation ECE R79 for electrical steering installations. This requirement can be fulfilled by means of the measurement arrangement according to the invention, as long as a further measurement arrangement is provided at the cylinder in addition to the aforementioned measurement arrangement, by means of which the location of the piston, that is arranged so as to be moveable, can be determined redundantly. For this purpose it is necessary to provide two separate arrangements for the generation of two particular reference voltages, two separate application arrangements to apply the reference voltage, two separate detection arrangements for a detection of a measurement voltage as well as two separate evaluation arrangements. All supply and output lines of the reference voltage or the measurement voltage must be provided separately. Since on the basis of the superposition principal the flows of the reference sources are superimposed linearly, then in the case of error, only the absolute voltages are changed. The relative relationships however remain unchanged. Accordingly several measurement principals can be applied to great advantage in the redundant application so that the components of the cylinder are used along with the measurement of the path. Thereby the number of possible error modi of the system is less to great advantage than in the case of the use of separate sensor elements.

With respect to the process, the problem posed initially is solved by the teaching of claim 17. Accordingly, the determination of the position of a piston arranged so as to move within the cylinder housing is preferably performed by means of a measurement arrangement according to one of the claims 1 through 16. The measuring arrangement includes an arrangement for the generation of a reference voltage, an application arrangement for the application of the reference voltage, a detection arrangement for the detection of a measurement voltage and an evaluation arrangement. According to the invention, the reference voltage is applied to the cylinder at a first position and at a second position by means of the application arrangement. The first position is spaced from the second position in the direction of movement of the piston. The measurement voltage is detected by the detection arrangement at a third position of the cylinder. The reference voltage and the measurement voltage are conducted to the evaluation arrangement.

Since the measurement according to the invention is performed according to one of the claims 1 through 16, the preceding part of the description is referred to in order to avoid repetition. Anyone skilled in the art of the present subject will be able to further develop the measurement process according to the invention with corresponding process characteristics among knowledge of the preceding part of the description, so that reference is made to the preceding part of the description regarding further developments of the measurement process according to the invention.

Finally the problem cited initially regarding a steering cylinder of a steering arrangement of a vehicle is solved according to the characteristics of claim 18. Accordingly the steering cylinder is provided with a cylinder housing and a piston arranged to move within the cylinder housing, The position of the piston of the steering cylinder in the cylinder housing can be determined by at least one measurement arrangement according to one of the claims 1 through 16. This may be, for example, about a steering angle determination on a hydrostatic steering arrangement of a utility vehicle, for example, a tractor. Such a steering arrangement may be a part of a "steer by wire" steering arrangement. In this embodiment it is appropriate to provide a steering cylinder as a hydraulic cylinder configured in the form of a differential cylinder. In this case the piston rod extends at both ends out of the hydraulic cylinder and is easily accessible for measurement evaluations of the detection arrangement or the application arrangement. In general steering cylinders are provided with equal hydraulically effective surfaces at both ends and the steering arrangement can perform symmetrical movements. An embodiment of a steering cylinder of a steering arrangement is shown in the figure description, so that reference is made to it here. In such an application it may be necessary to provide a second measuring arrangement alongside a first measuring arrangement, in which the position of the piston is measured with a redundancy that is indicated, for example, in claim 16. Accordingly the measurement process, according to the invention, is applied simultaneously or with a time delay by means of two measurement arrangements on the same cylinder for the determination of the position of the piston in the cylinder.

Now there are various possibilities to embody and further develop the teaching of the present patent application to great advantage. For this purpose, reference is made on the one hand to the claims following claim 1 and on the other hand to the following preferred embodiments of the invention on the basis of the drawings. In connection with the preferred embodiments of the invention on the basis of the drawings in general also preferred embodiments and further developments of the teaching according to the invention are explained. The drawings show, in each case schematically:

DESCRIPTION OF THE PREFERRED EMBODIMENT

In the figures, identical or similar components are identified with the same part number call-outs.

Figure 1:
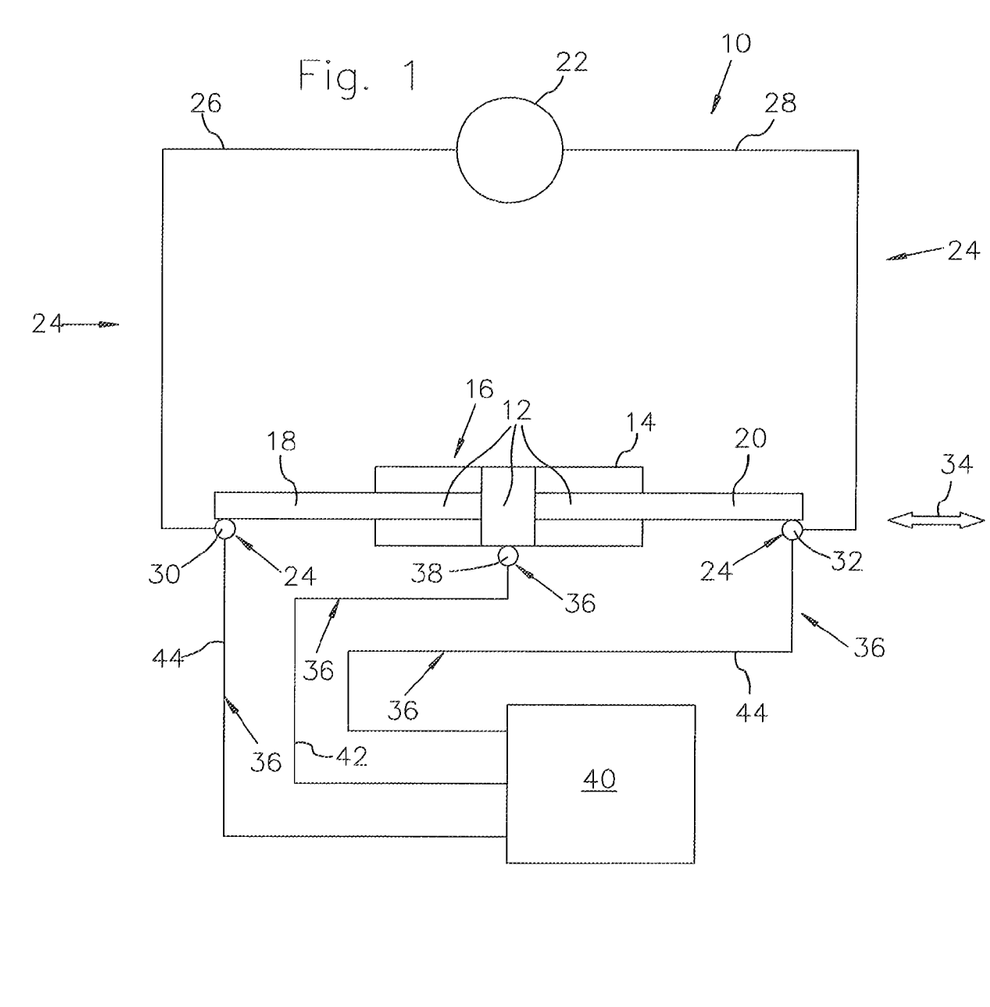
FIGS. 1-5 respectively show five different embodiments of measurement arrangements for measuring the movement of a hydraulic piston, comprising two piston rods, within a cylinder housing of a hydraulic cylinder.

FIG. 1 shows a first embodiment of the invention with a measuring arrangement 10, by means of which the position of a piston 12 in a cylinder housing 14 can be determined. The piston 12 and the cylinder housing 14 form a cylinder 16 that is configured as a differential cylinder, in which a piston rod 18 or 20 is extended at each end of the cylinder 16. The cylinder 16 operates on a hydraulic basis, where the incoming and draining lines for the hydraulic fluid are not shown for the sake of clarity.

The measurement arrangement 10 includes a reference voltage generator arrangement 22 for the generation of a reference voltage of 10 mV in the form of an alternating current voltage as well as a reference current of 100 Amps. The reference voltage is applied to the cylinder 16 by means of the application arrangement 24. The application arrangement 24 includes electric lines 26 and 28 that extend in each case from the voltage generator arrangement 22 for the generation of the reference voltage to a first position 30 at the left end of the piston rod 18 or to a second position 32 at the right end of the piston rod 20. The lines 26 and 28 are configured in the form of flexible cables. Correspondingly, the reference voltage generated by the voltage generator arrangement 22 is applied to the cylinder 16, over the lines 26 and 28 at the first position 30 and the second position 32 by means of the application arrangement 24. The first position 30 is arranged at spacing from the second position 32 in the direction of the movement of the piston 12. The direction of movement of the piston 12 is indicated by the double arrow 34. A measurement voltage can be detected by means of a detection arrangement 36 at a third position 38. The third position 38 is arranged at the housing 14 of the cylinder 16, particularly in a central region. The measurement voltage can be conducted to an evaluation arrangement 40 over an electrical line 42. Moreover, the detection arrangement 36 includes devices that are, configured in the form of electrical lines 44. The reference voltage applied to the cylinder 16 by means of the electrical lines 26 and 28 can be detected at the first position 30 or the second position 32 and conducted to the evaluation arrangement 40. Thereby the evaluation arrangement 40 can measure and evaluate the measurement voltage relative to the reference voltage actually existing at the cylinder 16 (Kelvin-evaluation).

Figure 2:
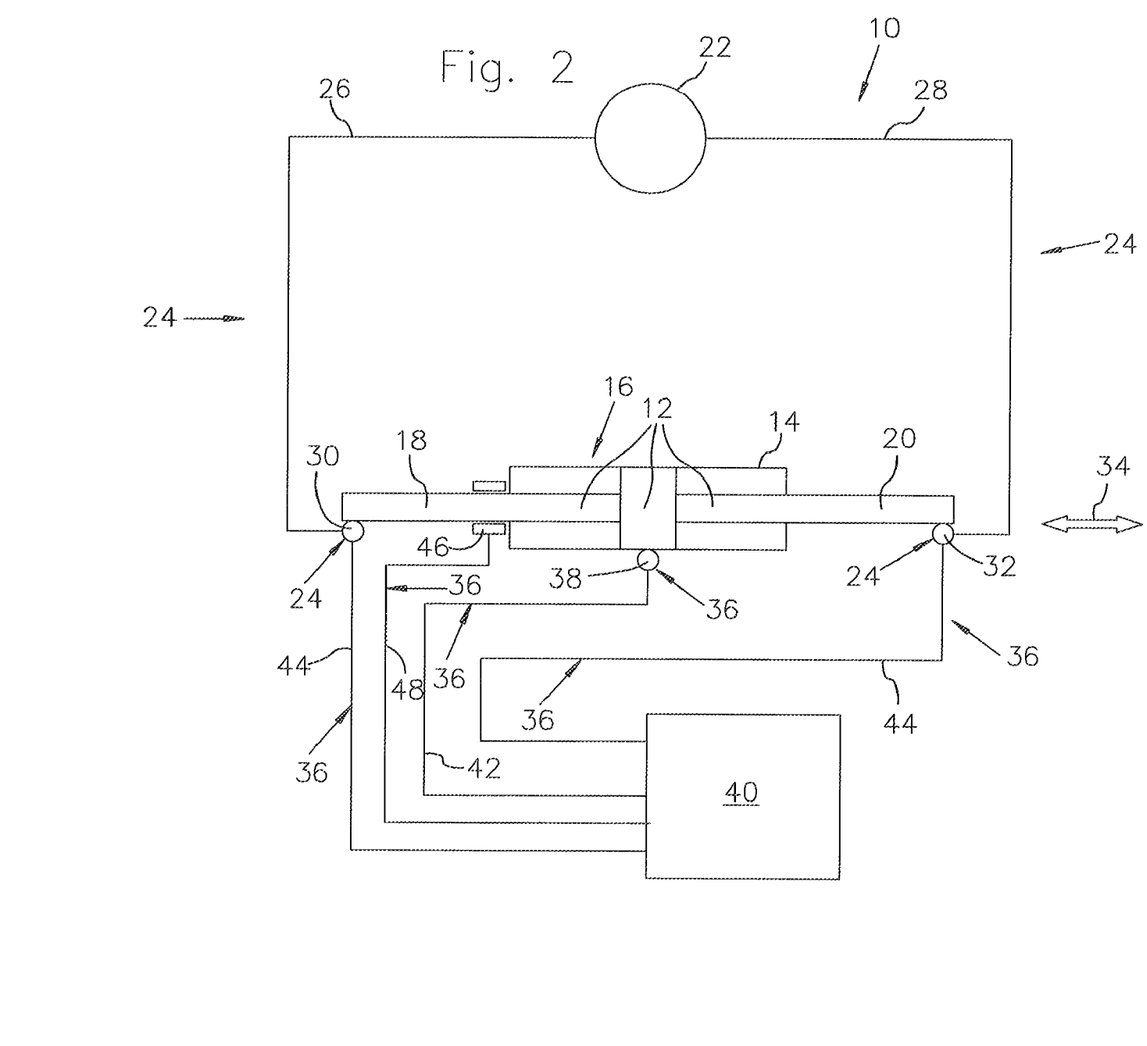

FIG. 2 shows a second embodiment of the invention which is basically comparable to first embodiment shown in FIG. 1. Accordingly a sliding contact 46 is fastened to the cylinder housing 14 insulated electrically, where the sliding contact 46 is associated with the detection arrangement 36. The sliding contact 46 is provided at the entry of the piston 12 or the piston rod 18. The sliding contact 46 connects the piston 12 or the piston rod 18 with an electrical line 48, which, for its part, establishes an electrical connection between the sliding contact 46 and the evaluation arrangement 40. The use of a sliding contact 46 reduces the sensitivity of the measurement process according to the invention to the contact resistance relationships in the area of the seals between the piston 12 and the cylinder housing 14. Otherwise the method of operation of the second embodiment is comparable to that of the first embodiment, according to FIG. 1. There are two evaluation arrangements at the positions 38 and 46.

Figure 3:
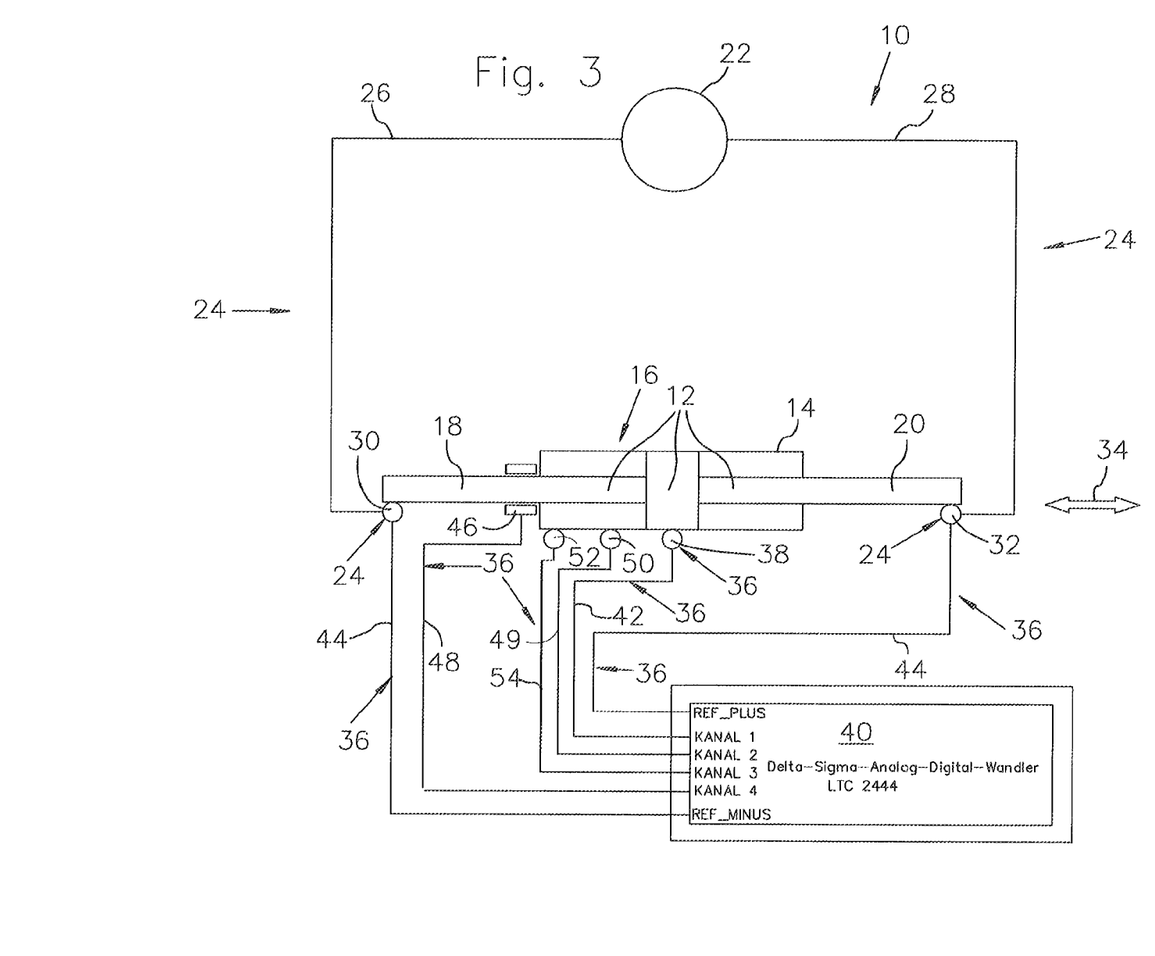

FIG. 3 shows a third embodiment of the invention that is comparable to the second embodiment shown in FIG. 2. Accordingly the evaluation arrangement 40 is provided with several input channels. Moreover the detection arrangement 36 is provided with two further devices for the evaluation of a measurement voltage at the cylinder 16, in addition to the electrical line 42 which connects a third position 38 with the evaluation arrangement 40. This is an electrical line 49 on the one hand that connects a fourth position 50 with the evaluation arrangement 40. On the other hand a fifth position 52 is connected to the evaluation arrangement 40 by an electrical line 54. Correspondingly, the voltages prevailing at each point are evaluated as measurement voltages and directed to the evaluation unit 40 over the input channels 1 to 3, simultaneously at three positions along the cylinder housing 14, particularly at the third position 38, at the fourth position 50 and at the fifth position 52. A sliding contact 46 is also used to detect a measurement voltage that is directed to the evaluation arrangement 40 and conducted over the electric line 48 to the inlet channel 4 of the evaluation arrangement 40. The reference voltages generated by the arrangement 22 and existing at the cylinder 16 are conducted over the electrical line 44 or 48 to a MINUS-Reference input channel or a PLUS-REFERENCE input channel, by means of the Kelvin-detector at the first position 30 or the second position 32. Correspondingly a total of four measurement voltages are evaluated by means of a Delta-Sigma-Analog Digital converter with the designation LTC 2444 (not shown) for the determination of the position of the piston 12 in the cylinder housing 14.

Figure 4:
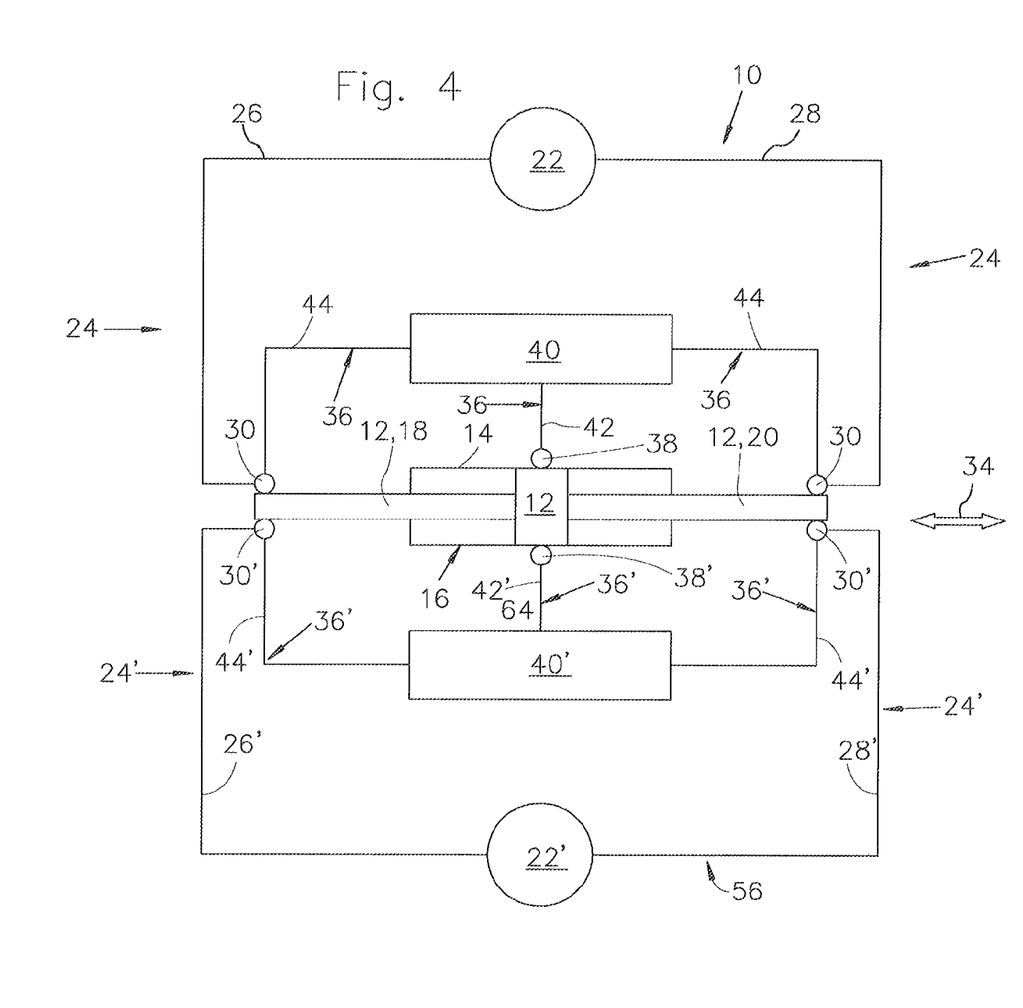

FIG. 4 shows a fourth embodiment of the invention. A measurement arrangement 10 is shown that is configured comparably to that of the first embodiment according to FIG. 1. In addition to the measurement arrangement 10 a further measurement arrangement 56 is provided that is configured identically to that in FIG. 1. The part number call-outs of the further measuring arrangement 56 that correspond to the components of the measuring arrangement 10 are identified with an apostrophe. Each of the application arrangements 24' or the detection arrangement 36' is arranged at comparable positions relative to the direction of movement 34 of the piston 12. In so far a redundant detection of the position of the piston 12 is possible by means of the two measurement arrangements 10, 56.

Figure 5:
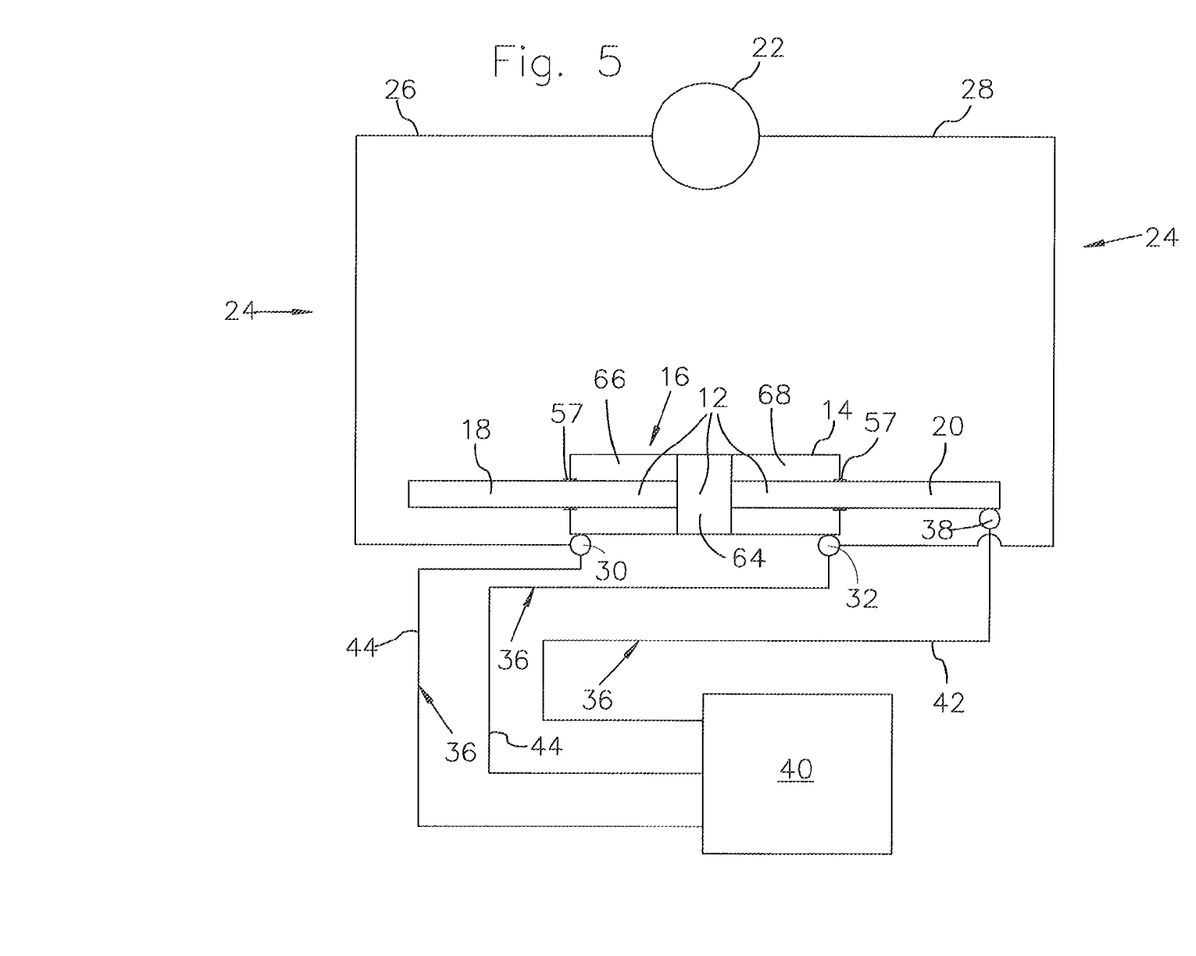

FIG. 5 shows a fifth embodiment of the invention. The application arrangement 24 is located at a first position 30 at the left end of the cylinder housing 14 and a second position 32 at the right end of the cylinder housing 14. The measurement voltage is detected at a third position 38 by means of the detection arrangement 36 and is conducted to the evaluation arrangement 40. The third position 38 is provided at the right end of the piston rod 20. Correspondingly the measurement voltage is detected at the piston rod 20. In this embodiment the metallic contact points in the area of the piston seals is used as a sliding contact between the piston 12 and the cylinder housing 14. The piston rod seal 57 between the piston rod 18 or to piston rod 20 and the cylinder housing 14 is insulated in its configuration.

The cylinder 16 includes a cylinder housing 14 as well as a piston 12. The piston 12 is provided with a left piston rod 18 and a right piston rod 20, as well as a piston body 64 arranged between the two piston rods 18 and 20. The piston body 64 seals a left ring space 66 as against a right ring space 68 and is arranged so as to move in the interior of the cylinder housing 14. The piston rods 18 and 20 can be configured as one piece components with the piston body 64.

Figure 6:
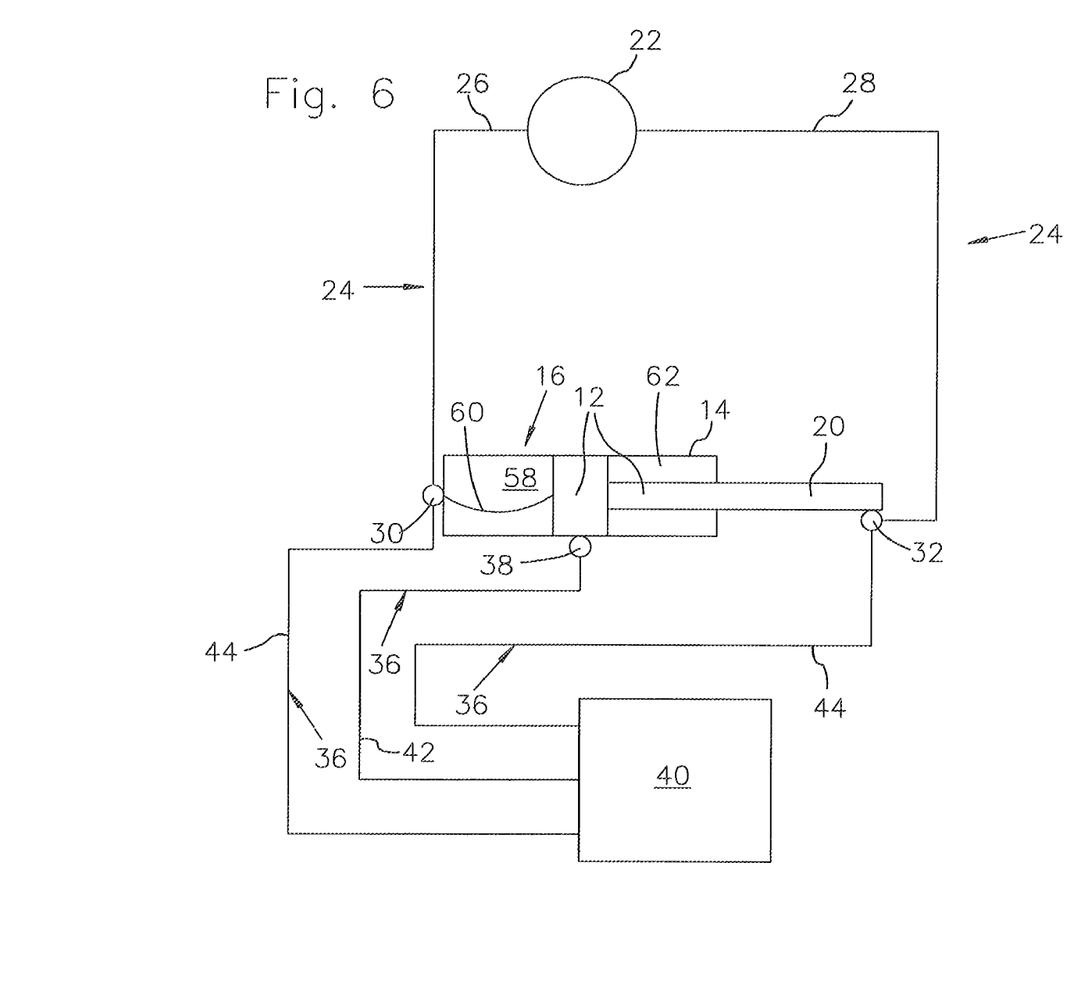
FIG. 6 is a schematic representation of a measurement arrangement for measuring the movement of a hydraulic piston, comprising a single rod, within a cylinder housing of a hydraulic cylinder.

FIG. 6 shows a sixth embodiment of the invention with a cylinder 16, in which the piston 12 is provided with only one piston rod 20 extending out of the cylinder housing 14 on only one side. The application arrangement 24 connects the arrangement 22 for the generation of the reference voltage with the first position 30 that is arranged at the left end of the cylinder housing 14. Moreover, the application arrangement 24 connects the arrangement 22 for the generation of the reference voltage with the second position 32 that is provided at the right end of the piston rod 20. The detection of the measurement voltage is performed on a central region of the cylinder housing 14 at the third position 38 with the detection arrangement 36. The piston 12 is connected to the cylinder housing 14 over the electric line 60 provided in the piston chamber 58. The internal connection of the flexible electrical line 60 to the cylinder housing 14 is arranged on the interior side in the area of the first position 30. No electrical line connection is provided in the ring space 62 of the cylinder 16. The cylinder 16 is a double acting hydraulic cylinder. The hydraulic lines of the piston chamber 58 or the ring space 62 of the cylinder 16 are not shown for the sake of clarity.

In closing, it should be noted that the above embodiments are used only for the claim of the present teaching, but do not limit it thereby.

The invention claimed is:

1. In combination with a hydraulic cylinder (16) including cylinder housing (14), and a piston (12) arranged so as to move in the cylinder housing (14), a measurement arrangement (10, 56) for the determination of the position of the piston (12) in the cylinder housing (14) of the cylinder (16), comprising:
a reference voltage generator arrangement (22) for the generation of a reference voltage;
an application arrangement (24) coupled between the reference voltage generator arrangement (22) and the cylinder (16) for the application of a reference voltage at a first position (30) and at a second position (32), with the first position (30) being spaced from the second position (32) in a direction of movement of the piston (12) and with the first and second positions (30 and 32) being on the exterior of the cylinder (16);
a detection arrangement (36) be in coupled to the first position (30), the second position (32) and to a third position (38) on the exterior of the cylinder (16), with the third position being electrically coupled to the first and second positions (30 and 32), respectively, for the detection of a measurement voltage; and
an evaluation arrangement (40) being coupled to the detection arrangement (36) for determining the position of the piston within the cylinder housing.

2. The combination according to claim 1, wherein the third position (38) is spaced from at least one of the first position (30) and the second position (32).

3. The combination according to claim 1, wherein said detection arrangement (36) includes at least first and second separate devices (44) for detecting the reference voltage at the cylinder (16), with the first device (44) being coupled between the first position (30) and the evaluation arrangement (40) and with the second device (44) being coupled between the second position (32) and the evaluation arrangement (40).

4. The combination according to claim 1, wherein the detection arrangement (36) includes at least one further device (48, 49, 54) coupled between at least one further position (46, 50, 52) on said cylinder (16) and said evaluation arrangement (40), with the at least further position (46, 50, 52) being electrically coupled to said first and second positions (30 and 32), respectively, by means of which a measurement voltage can be detected at the cylinder (16).

5. The combination according to claim 1, wherein at least one of the three positions (30, 32, 38) is provided at the cylinder housing (14) and wherein at least another of the three positions (30, 32, 38) is provided at an outer end of one or another of piston rods (18 and 20) forming part of the piston (12).

6. The combination according to claim 1, wherein the first, second and third positions (30, 32, 38) are provided on the outside of the cylinder (16).

7. The combination according to claim 1, wherein the detection arrangement (36) includes at least one sliding contact (46) at the entry of the piston rod (18) or (20) of the piston (12) into the cylinder housing (14), so that it is connected electrically conducting to the piston (12).

8. The combination according to claim 1, wherein the piston (12) includes at least one piston rod (18 or 20) and an electrically insulating seal (57) is provided between the at least one piston rod (18 or 20) of the piston (12) and the cylinder housing (14) in the area of the entry of the at least one piston rod (18 or 20) of the piston (12) into the cylinder housing (14).

9. The combination according to claim 1, wherein the piston (12) is connected to the cylinder housing (14) by means of a sliding contact so as to conduct electricity, by means of a sliding contact between the piston (12) and the interior wall of the cylinder housing (14).

10. The combination according to claim 1, wherein one of the positions (30, 32, 38) on the exterior of the cylinder housing (14) is connected by means of a flexible electrical line (60) to a position of the piston (12) that is located in the interior of the cylinder (16) and arranged to be moved.

11. The combination according to claim 1, wherein the cylinder (16) is one of a hydraulic cylinder or a pneumatic cylinder.

12. The combination according to claim 1, wherein the cylinder (16) is configured as one of a single actin cylinder or a double acting cylinder.

13. The combination according to claim 1, wherein the cylinder (16) is a hydraulic cylinder configured as a differential cylinder.

14. The combination according to claim 1, wherein the reference voltage generation arrangement (22) generates a reference voltage which is one of a direct current voltage, alternating current voltage or a pulsed direct current voltage.

15. The combination according to claim 1, wherein evaluation arrangement (40) includes means for performing an evaluation of the measurement voltage that includes a multi-channel delta-sigma-analog-digital converter including at least one reference voltage channel and at least one measurement input voltage channel, where at least one of the reference voltages at the cylinder (16) is connected to the at least one reference voltage input channel of the delta-sigma-analog-digital converter.

16. The combination according to claim 1, wherein a further measurement arrangement (56) similar to said measurement arrangement (10) is provided by means of which the position of the piston (12) that is arranged to be moveable in the cylinder housing (14) of the cylinder (16) can be determined redundantly.

17. A measurement process for determining a position of a piston (12) of a cylinder (16) arranged for movement within the cylinder housing (14) by means of a measurement arrangement (10, 56) comprising the steps of:
  (1) generating a reference voltage;
  (2) applying the reference voltage to first and second positions (30, 32) of the cylinder (16), which are spaced apart from each other in a direction of movement of the piston (12) within the housing (14) of the cylinder (16);
  (3) detecting a measurement voltage at a third position (38) of the cylinder (16); and
  (4) evaluating the movement of the piston (12) by a calculation using the reference voltage and the measurement voltage.

18. In a vehicle steering arrangement including a steering cylinder (16), where the steering cylinder (16) is provided with a cylinder housing (14) and a piston (12) arranged so as to be moveable within the cylinder housing (14), at least one measurement arrangement (10, 56) for determining the position of the piston (12) of the steering cylinder (16) within the housing (14), comprising:
  a reference voltage generation arrangement (22) for the generation of a reference voltage;
  an application arrangement (24) coupled between the reference voltage generation arrangement (22) and the cylinder (16) for the application of a reference voltage at a first position (30) and at a second position (32), with the first position (30) being spaced from the second position (32) in a direction of movement of the piston (12) and with the first and second positions (30 and 32) being on the exterior of the cylinder (16);
  detection arrangement (36) being coupled to the first position (30), the second position (32) and to a third position (38) on the exterior of the cylinder (16), with the third position (38) being electrically coupled to the first and second positions (30 and 32), respectively, for the detection of a measurement voltage; and
  an evaluation arrangement (40) being coupled to the detection arrangement (36) for determining the position of the piston within the cylinder housing.

\* \* \* \* \*